Dec. 6, 1949 A. C. BEDFORD 2,490,614
MACHINE FOR THE GRINDING OF CUTTING TOOLS
Filed Oct. 3, 1947 3 Sheets-Sheet 1

ARTHUR C. BEDFORD,
INVENTOR
BY
ATTORNEY

Dec. 6, 1949      A. C. BEDFORD      2,490,614
MACHINE FOR THE GRINDING OF CUTTING TOOLS
Filed Oct. 3, 1947      3 Sheets-Sheet 3

ARTHUR C. BEDFORD,
INVENTOR

BY *Thomas E. Spawn*
ATTORNEY

Patented Dec. 6, 1949

2,490,614

UNITED STATES PATENT OFFICE 2,490,614

MACHINE FOR THE GRINDING OF CUTTING TOOLS

Arthur Cuthbert Bedford, Whitnash, Leamington Spa, England, assignor of one-half to Jack William Ramsden, Leamington Spa, Warwick County, England Application October 3, 1947, Serial No. 777,745
In Great Britain May 15, 1946

Section 1, Public Law 690, August 8, 1946
Patent expires May 15, 1966

4 Claims. (Cl. 51—92)

This invention relates to machines for the grinding of cutting tools, more particularly tools for cutting or working metals, such tools having a cutting edge of substantially V section provided on a bar or stock constituting the body of the tool.

The cutting edge of the tool is formed by the edge between the end face of the tool adjacent the work, and the top surface, that is the side face of the tool towards which the work revolves during a cutting operation. The end face of the tool is commonly ground to a flat or transversely curved surface sloping backwardly from the "top" surface, and the said top surface is then ground to form an angle to the direction of approach of the tool to the work, this angle being termed the "top rake" of the tool. It has been found advantageous to form the top rake by grinding an arcuate surface on the top surface of the tool, providing what is known as, and hereinafter referred to as, "curved top rake," and the object of the present invention is to provide a grinding machine in which is incorporated a convenient and simple means for setting the tool for grinding to produce curved top rake thereon, the said means ensuring that the correct angle at the cutting edge is obtained.

According to the invention, a grinding machine for producing or restoring curved top rake on a tool comprises a grinding wheel, means for supporting the tool, means for setting the tool in a predetermined relation to said supporting means, an adjustable stop for said supporting means, and indicating means moving with the said stop and co-operating with a scale, the arrangement being such that the setting of the indicating means to a selected scale marking so positions the stop that, with the supporting means in the position determined by the stop, the tool is so positioned with relation to the grinding wheel that the angle of top rake applied thereto corresponds to the scale marking.

The indicating means may comprise an arm movable about a pivot and co-operating with an arcuate scale, and the stop may be movable along the length of the arm. The means for setting the tool is a predetermined relation to the tool supporting means may comprise a stop mounted in a fixed relation to the grinding wheel and means for locating the supporting means in a predetermined relation to said stop.

The invention is hereinafter described with reference to the accompanying drawings, in which:

Figures 4 and 5 are explanatory diagrams showing how the setting of the indicating means determines the angle of top rake applied to a tool.

Figure 1:
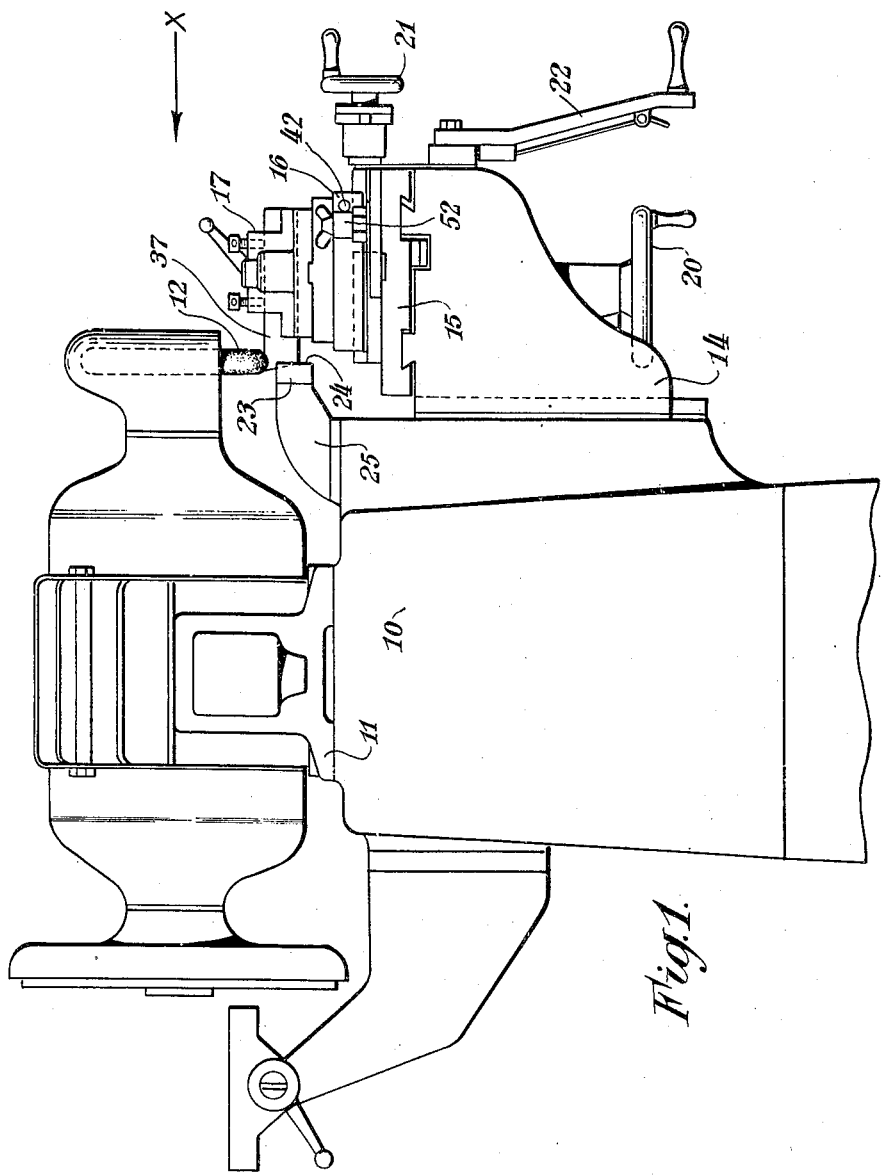
Figure 1 is a side elevation of one form of grinding machine according to the invention.
Figure 2:
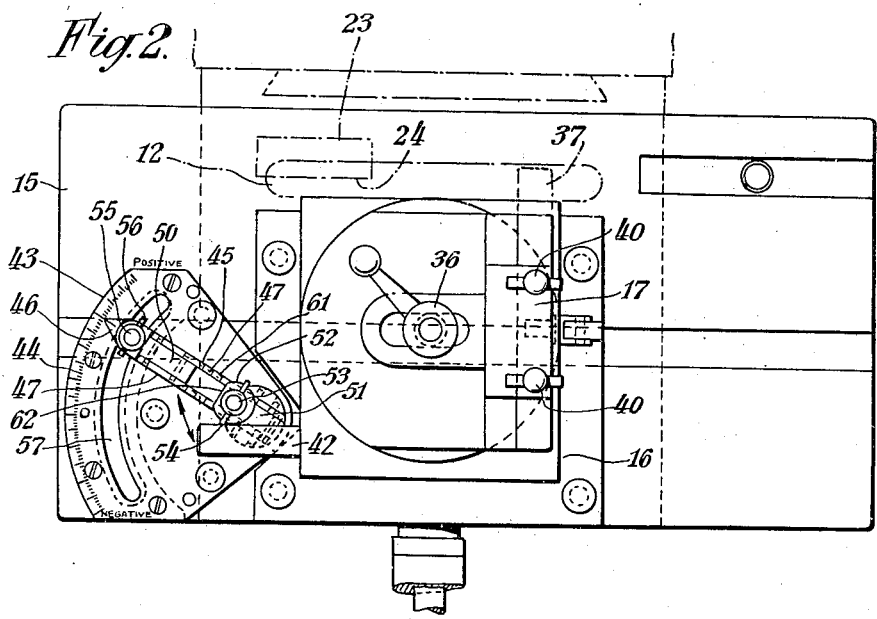
Figure 2 is a plan view, on an enlarged scale, of the tool supporting and setting means of the machine as shown in Figure 1.
Figure 3:
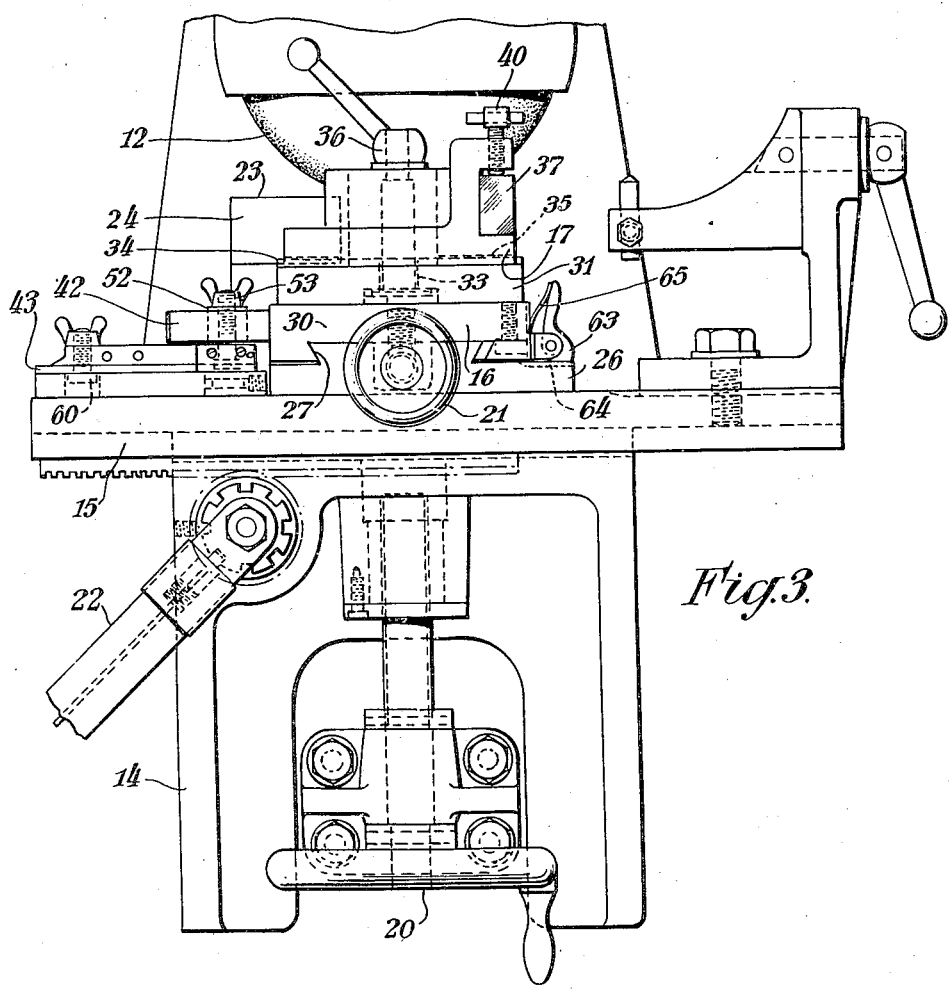
Figure 3 is a view in elevation looking in the direction of the arrow X in Figure 1.

Referring to Figures 1 to 3 of the drawings, the grinding machine comprises a frame or bed 10 to the top surface of which is bolted the housing 11 of an electric motor, the spindle of which projects at one end to receive a grinding wheel 12. Below the wheel 12 there is mounted, in the frame 10, a vertically moving dovetail slide 14, on the upper surface of which is a horizontally reciprocable carriage 15, the direction of reciprocation of the carriage being at right angles to the axis of the motor spindle. A further dovetail slide 16, movable in a direction at right angles to the direction of reciprocation of the carriage, is mounted on the carriage, and itself carries a tool holder 17 which is angularly adjustable about a central vertical pivot. The usual screw and nut mechanism, operated by handles 20 and 21 respectively, is provided for moving the slides 14 and 16, and the carriage 15 is adapted to be reciprocated by oscillatory movement of a handle 22 acting on the carriage through rack and pinion gearing. The opposite end of the motor spindle may carry a second grinding wheel adapted for general grinding purposes, including the grinding of the front faces of the tools.

The grinding wheel 12 has its edge trimmed to a rounded form, so that the cross-section in any radial plane is a circular arc the centre of which is in the mid-plane of the thickness of the wheel. A stop 23 having a flat face 24 is mounted rigidly on the frame 10 by means of a bracket 25, the face 24 lying in the mid-plane of the thickness of the grinding wheel 12. The stop 23 is spaced from the grinding wheel 12 in the direction of reciprocation of the carriage 15.

A plate 26 bolted to the carriage 15 is formed on its upper surface with a dovetailed rib 27 providing the guide for the slide 16. The latter slide comprises a base plate 30 recessed to engage the rib 27, an intermediate plate 31 angularly adjustable on a central stud 32 fixed in the base plate, and the tool holder 17 which is laterally adjustable on the intermediate plate 31, the holder 17 being slotted as at 33 to permit the passage of the stud through it, and to permit such lateral adjustments. A rib 34 on the intermediate plate 31, engaging in a slot 33 in the tool holder 17, prevents relative angular movement of the parts. A nut 36 on the stud 32 clamps the tool holder and intermediate plate in any position to which they are set relative to the base plate. The tool to be ground, which is indicated by reference 37, is clamped to the tool holder by screws 40 mounted in the projecting upper portion of a lug 41 on the tool holder. The base plate 30 of the slide 16 carries a pin 42 projecting in a direction at right angles to the direction of movement of the said slide.

On the upper surface of the carriage there is mounted (see Figure 2) a sector-shaped plate 43 having on its curved edge a scale 44 marked in degrees of arc in both directions from a zero line parallel to the direction of movement of the carriage. An arm 45 turning about the centre from which the arc of the scale is struck has at its outer end an index 46 co-operating with the scale. The arm comprises two metal strips 47, 47 spaced by blocks 50 and 51, of which the block 50 carries the index 46, and an upstanding stop 52 is adapted to be clamped to the upper edges of the strips 47, 47 by a bolt 53 passing between the strips and having a head engaging their lower edges, and a wing nut 54. The arm 45 is adapted for clamping to the plate 43 by a bolt 55 and wing nut 56, the bolt passing through an arcuate slot 57 in the plate, and having a head 60 which engages with the under-surface of the plate. Graduations 61 on the arm 45, co-operating with a flat 62 on the stop 52, give a measure of the distance of the said stop from the axis about which the arm is pivoted. The stop 52 lies in the path of the pin 42 on the slide 16.

In order to set the tool 37 to a position relative to the grinding wheel in which top rake of the required angle will be applied to it, the arm 45 is first set to the zero position on the scale 44, and the position of the slide 16 is adjusted to bring the pin 42 into engagement with the stop 52, the carriage being so positioned that the tool holder is opposite the stop 23. The tool is then secured in the holder in such a position that its cutting edge is in contact with the face 24 of the stop 23. The carriage is then moved to bring the tool clear of the stop 23, and the arm 45 is set to the scale marking corresponding to the angle of top rake (positive or negative) which is required. In addition, the stop 52 is set to a distance from the pivot axis of the arm 45 equal to the radius of curvature of the edge of the grinding wheel. The slide 16 is then moved to a position in which the pin 42 again engages the stop 52, the tool is brought up to the grinding wheel by operation of the handle 20 to raise the slide 14, and the carriage is reciprocated by means of the handle 22 to pass the tool to and fro past the rotating grinding wheel, further movement of the handle 20 raising the slide 14 gradually to feed the tool towards the wheel.

The following explanation, taken in conjunction with Figures 4 and 5 of the drawings, shows how the required top rake is obtained in the manner above set out.

In Figure 4, A represents the centre of curvature of the edge of the grinding wheel 12, and B the cutting edge of the tool 37, whilst C and D are respectively the intersections of a vertical line through A, with a line making a tangent with the curved edge of the grinding wheel at B, and with a line perpendicular to the said vertical line and passing through B. The angles DAB and DBC are equal, since each is equal to a right angle minus the common angle ABD, that is, the top rake angle is equal to the angle DAB subtended at the centre of curvature of the grinding wheel edge by the arc between the lines AB and AD. For a given radius of curvature of the edge of the grinding wheel, the distance BD perpendicular to the line AD determine the angle DAB, and consequently, the top rake applied to the tool is determined by the position of the edge of the tool, in the direction of the line BD, relative to the point D.

The tool 37 is first set up with its edge against the stop face 24, i.e., on the line ADC, and is then moved a distance (FG, Fig. 5) in the direction of the line BD determined by adjusting the stop 52, which swings in an arc having a radius EF equal to the radius AB, through an angle equal to the required angle of top rake (i.e., angle FEG= angle DBC). The angle FEG must therefore also be equal to the angle DAB, and the distance FG must be equal to the distance BD, so that the edge of the tool is positioned with relation to the central plane of the grinding wheel in the correct relation to receive the required angle of top rake.

Figure 6:
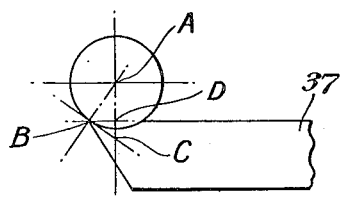
Figures 6 and 7 are views similar to Figure 4 showing different forms of grinding wheel.
Figure 7:
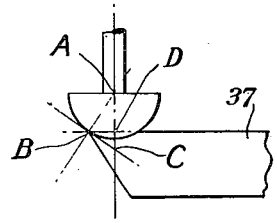

In an alternative arrangement, shown diagrammatically in Figure 6, the grinding wheel 12 has a cylindrical edge, and is mounted on a spindle lying parallel to the stop face 24, which face is in the vertical diametral plane of the wheel. The tool is set up for grinding in the manner above described, but in this case the lines AD and AB lie along radii of the grinding wheel. In another alternative arrangement, shown in Figure 7, the grinding wheel 12 may rotate about a vertical spindle, its grinding surface being of part-spherical form and the lines AD and AB being radial to said part-spherical surface.

The stop 23 may be dispensed with, and replaced by a suitable stop on the carriage 15 or on the slide 16, since, the relative positions of the frame 10 and the carriage 15 being fixed in the direction of movement of the slide 16, such a stop will determine the position of the tool relative to the grinding wheel. Such a stop must evidently be displaceable, so that it can engage with the edge of the tool when required, but can be moved out of the way when the tool is brought up to the grinding wheel.

A catch 63 pivotally mounted on the base plate 30 of the slide 16 is adapted to engage in a groove 64 in the plate 26, the catch 63 and groove 64 being so positioned that, when the catch is engaged in the groove, the slide 16 is in the position in which, with the arm 45 opposite the zero mark on the scale 44, the pin 42 would engage with the stop 52. The slide 16 can thus be set to the zero position without first setting the arm 45 to the zero mark on the scale. The catch 63 is loaded by a spring 65 towards a position in which it lies in the groove 64.

What I claim is:

1. A grinding machine for producing or restoring curved top rake on a tool by forming a part-cylindrical top-rake surface thereon comprising a carriage, means for reciprocating the said carriage, means for supporting the tool on said carriage with the axis of the top-rake surface to be formed thereon parallel to the direction of reciprocation of the carriage, a grinding wheel shaped to form the part cylindrical surface, means for setting the tool in a predetermined relation to said supporting means, means for moving said supporting means in a direction perpendicular to the direction of reciprocation of the carriage, an arm, a pivotal mounting for said arm on the carriage, a stop located on said arm at a distance from the pivot thereof equal to the radius of the part-cylindrical surface to be formed on the tool, and a scale co-operating with said arm, the zero mark of said scale being on a line passing through the pivot of the arm and parallel to the direction of reciprocation of the carriage, the arrangement being such that the setting of the arm to the zero scale marking so positions the stop thereon that when the supporting means is in engagement therewith and the tool is set in the predetermined relation thereto the cutting edge of the tool lies in such relation to the grinding wheel that the top rake applied thereto would be zero whereby setting of the arm to a selected scale marking so positions the stop that, with the supporting means in the position determined by the stop on the arm, the angle of top rake applied to the tool corresponds to the scale reading.

2. A grinding machine according to claim 1, wherein a catch is provided to locate the tool supporting means in the position which it takes up when it is in engagement with the stop on the arm and the arm is in register with the zero mark on the scale.

3. A grinding machine for producing or restoring curved top rake on a tool by forming a part-cylindrical top-rake surface thereon, comprising a carriage, means for reciprocating the said carriage, means for supporting the tool on said carriage with the axis of the top-rake surface to be formed thereon parallel to the direction of reciprocation of the carriage, a grinding wheel shaped to form the part cylindrical surface, means for setting the tool in a predetermined relation to said supporting means, means for moving said supporting means in a direction perpendicular to the direction of reciprocation of the carriage, an arm, a pivotal mounting for said arm on the carriage, a stop movable along said arm, means for clamping the stop to the arm in any selected position, and a scale co-operating with said arm, the zero mark of said scale being on a line passing through the pivot of the arm and parallel to the direction of reciprocation of the carriage, the arrangement being such that the setting of the arm to the zero scale marking so positions the stop thereon that when the supporting means is in engagement therewith and the tool is set in the predetermined relation thereto the cutting edge of the tool lies in such relation to the grinding wheel that the top rake applied thereto would be zero, whereby setting of the stop on the arm to a distance from the pivot equal to the radius of the top rake surface to be applied to the tool and setting of the arm to a selected scale marking so positions the said stop that, with the supporting means in the positions determined by the said stop, the angle of top rake applied to the tool corresponds to the scale reading.

4. A grinding machine for producing or restoring curved top rake on a tool by forming a part-cylindrical top-rake surface thereon comprising a carriage, means for reciprocating the said carriage, means for supporting the tool on said carriage with the axis of the top-rake surface to be formed thereon parallel to the direction of reciprocation of the carriage, a grinding wheel shaped to form the part cylindrical surface, a stop mounted in fixed relation to the grinding wheel, means for locating the supporting means in a predetermined relation to said stop so that the tool, when set up on the supporting means in engagement with the stop is in a predetermined relation to the said supporting means, means for moving said supporting means in a direction perpendicular to the direction of reciprocation of the carriage, an arm, a pivotal mounting for said arm on the carriage, a stop located on said arm at a distance from the pivot thereof equal to the radius of the part-cylindrical surface to be formed on the tool, and a scale co-operating with said arm, the zero mark of said scale being on a line passing through the pivot of the arm and parallel to the direction of reciprocation of the carriage, the arrangement being such that the setting of the arm to the zero scale marking so positions the stop thereon that when the supporting means is in engagement therewith and the tool is set in the predetermined relation thereto the cutting edge of the tool lies in such relation to the grinding wheel that the top rake applied thereto would be zero, whereby setting of the arm to a selected scale marking so positions the stop that, with the supporting means in the position determined by the stop on the arm, the angle of top rake applied to the tool corresponds to the scale reading.

ARTHUR CUTHBERT BEDFORD.

REFERENCES CITED

The following references are of record in the file of this patent:

UNITED STATES PATENTS

| Number | Name | Date |
|---|---|---|
| 1,378,831 | Ashton | May 24, 1921 |
| 1,515,039 | Hanson | Nov. 11, 1924 |

FOREIGN PATENTS

| Number | Country | Date |
|---|---|---|
| 558,974 | Great Britain | Jan. 28, 1944 |